United States Patent
Kelch et al.

(10) Patent No.: US 9,856,374 B2
(45) Date of Patent: Jan. 2, 2018

(54) TWO-COMPONENT COMPOSITION

(71) Applicant: SIKA TECHNOLOGY AG, Baar (CH)

(72) Inventors: Steffen Kelch, Oberengstringen (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/766,220

(22) PCT Filed: Feb. 25, 2014

(86) PCT No.: PCT/EP2014/053628
§ 371 (c)(1),
(2) Date: Aug. 6, 2015

(87) PCT Pub. No.: WO2014/131757
PCT Pub. Date: Sep. 4, 2014

(65) Prior Publication Data
US 2015/0368466 A1    Dec. 24, 2015

(30) Foreign Application Priority Data
Feb. 26, 2013  (EP) ..................................... 13156733

(51) Int. Cl.
| | | |
|---|---|---|
| *C08L 63/00* | (2006.01) | |
| *C08L 75/08* | (2006.01) | |
| *C08G 18/48* | (2006.01) | |
| *C08G 18/50* | (2006.01) | |
| *C08G 18/58* | (2006.01) | |
| *C08G 18/75* | (2006.01) | |
| *C08G 59/50* | (2006.01) | |
| *C08G 18/28* | (2006.01) | |
| *C08G 59/24* | (2006.01) | |
| *C08G 59/18* | (2006.01) | |

(52) U.S. Cl.
CPC ............ *C08L 75/08* (2013.01); *C08G 18/289* (2013.01); *C08G 18/4866* (2013.01); *C08G 18/5024* (2013.01); *C08G 18/58* (2013.01); *C08G 18/581* (2013.01); *C08G 18/755* (2013.01); *C08G 59/184* (2013.01); *C08G 59/245* (2013.01); *C08G 59/50* (2013.01); *C08G 59/504* (2013.01); *C08L 63/00* (2013.01)

(58) Field of Classification Search
CPC ..... C08L 75/08; C08L 63/00; C08G 18/4866; C08G 18/5024; C08G 18/58; C08G 18/581; C08G 18/755; C08G 59/50; C08G 18/289; C08G 59/245; C08G 59/504; C08G 59/184
USPC .......................................................... 523/402
See application file for complete search history.

(56) References Cited

U.S. PATENT DOCUMENTS

| | | | | |
|---|---|---|---|---|
| 5,382,606 | A * | 1/1995 | Butikofer .............. | C04B 24/281 523/404 |
| 2004/0116644 | A1* | 6/2004 | Okuhira ................. | C08G 18/10 528/48 |
| 2009/0005498 | A1* | 1/2009 | Lin ........................ | C08G 18/10 524/588 |
| 2009/0075096 | A1 | 3/2009 | Butikofer et al. | |
| 2009/0318599 | A1* | 12/2009 | Brokamp .............. | C04B 41/009 524/261 |
| 2010/0040791 | A1* | 2/2010 | Funston ............. | C09D 133/066 427/386 |
| 2013/0037213 | A1* | 2/2013 | Frick ...................... | C08G 18/10 156/330 |

FOREIGN PATENT DOCUMENTS

| | | |
|---|---|---|
| EP | 0186191 A2 | 7/1986 |
| EP | 1090960 A1 | 4/2001 |
| EP | 1544230 A1 | 6/2005 |
| EP | 1717240 A1 | 11/2006 |

OTHER PUBLICATIONS

Apr. 10, 2014 Search Report issued in International Patent Application No. PCT/EP2014/053628.
English-language translation dated Sep. 1, 2015 International Preliminary Report on Patentability issued in International Patent Application No. PCT/EP2014/053628.

* cited by examiner

*Primary Examiner* — David T Karst
(74) *Attorney, Agent, or Firm* — Oliff PLC

(57) ABSTRACT

The invention relates to a two-component composition consisting of a component A, which comprises at least one silane-functional polymer and at least one epoxy resin, and consisting of a component B, which comprises water and at least one amine epoxy adduct. The composition cures quickly into an elastic material with a high strength and durability and is particularly suitable as an adhesive and/or a sealant.

17 Claims, No Drawings

US 9,856,374 B2

TWO-COMPONENT COMPOSITION

TECHNICAL FIELD

The invention relates to two-component compositions that are curable at room temperature and are based on silane-functional polymers, and to the uses thereof, in particular as an adhesive, a sealant or a coating.

PRIOR ART

Curable compositions based on silane-functional polymers are known. They are characterized by bubble-free curing and good adhesive strength. Most known compositions of this type are formulated as one-component compositions that cure in the presence of atmospheric humidity. These systems cure relatively slowly and are limited in terms of their maximum achievable strength. They frequently have relatively low crack propagation resistance, and thus are quite brittle. Moreover, they are relatively thermally unstable.

Combinations of silane-functional polymers with epoxy resins are known, for example from EP 0 186 191. In most cases, these are two-component systems in which the silane-functional polymer is typically present in one component and the epoxy resin is present in the other component. Systems of this type have substantially higher strengths and viscoelasticity. During application, however, in most cases a distinct, unpleasant amine odor is perceptible. In addition, when the amines are exposed to carbon dioxide ($CO_2$) in the air, particularly at high atmospheric humidity and low temperatures, they tend to form salts, which can result in slow or incomplete curing with diminished development of strength.

From EP 1 090 960, two-component systems are known in which a silane-functional polymer and an epoxy resin are present in one component, whereas the other component contains a silane, in particular an aminosilane, among other constituents. The described compositions have a long gel time (surface curing time).

DESCRIPTION OF THE INVENTION

The object of the present invention is to overcome the disadvantages of the prior art and therefore to provide a composition based on silane-functional polymers which can be applied without a distinct amine odor, which cures quickly, independently of the prevailing atmospheric humidity and without leaving behind a tacky surface, and which, when cured, has high strength and viscoelasticity, good adhesion to various types of substrates, and high thermal stability. The composition should further have good stability in storage prior to application, and the two components should be readily miscible and then easily applicable, particularly at room temperature. Unexpectedly, it has been found that this object is attained very effectively by a two-component composition according to claim 1. Component A comprises at least one silane-functional polymer and at least one epoxy resin. Component B comprises water and at least one amine-epoxy adduct. Each of these components has excellent stability in storage. The amine-epoxy adduct has only a very moderate or even no amine odor, allowing the composition to be handled practically odor-free, which represents a major advantage to those working with it. Unexpectedly, no problems at all in terms of compatibility occur upon mixing of the two components, especially when component B contains substantial fractions of water. The components can be mixed quite satisfactorily using simple mixers, producing a visually homogeneous composition which can be readily applied, and which strengthens rapidly and cures independently of climatic conditions, in particular independently of the prevailing atmospheric humidity. The cured composition typically has a non-tacky, uniform surface, is free of bubbles, and has excellent mechanical properties, particularly high strength and viscoelasticity, and high resilience. It exhibits good adhesion to a very wide range of substrates and high resistance to thermal and hydrolytic stress. The mechanical properties of the composition can be varied over a wide range by varying the epoxy resin content, without any incompatibilities being observed. The mixed and/or cured composition also unexpectedly exhibits only low rates of shrinkage, not critical to functioning, even when substantial quantities of water are present. The mixing ratio of the two components can vary within a broad range, and the degree of crosslinking of the epoxy resin can be adjusted by adjusting the quantity of component B that is added.

The fact that the combination of these two components leads to materials of such quality could not be derived from the prior art. Neither the use of amine-epoxy adducts nor the use of aqueous curing agents is specified in the prior art for curing a mixture of silane-functional polymer and epoxy resin. Unexpectedly, it has been found that the use of amine-epoxy adducts enables final curing to be achieved more quickly than when non-adducted polyamines are used. Also unexpected is the discovery that, when aqueous curing agents are used, the high water content of these, which can amount to many times the water that is required for crosslinking the silane groups, does not result in any problems with compatibility or inadequate mechanical properties, or to any notable shrinkage.

Further aspects of the invention are the subject matter of additional independent claims. Particularly preferred embodiments of the invention are the subject matter of the dependent claims.

DETAILED DESCRIPTION OF THE INVENTION

The subject matter of the invention is a two-component composition consisting of a component A, which comprises
    at least one silane-functional polymer, and
    at least one epoxy resin,
and a component B, which comprises
    water, and
    at least one amine-epoxy adduct, which has at least three amine hydrogens. The term "silane group" refers to a silyl group bonded to an organic residue and having one to three, in particular two or three, hydrolyzable alkoxy group(s) on the silicon atom, i.e. an alkoxysilyl group. Correspondingly, a "silane" refers to a compound that has at least one silane group. The term "silane-functional polymer" refers to a polymer which has at least one silane group, with the term "polymer" also being understood to include oligomers and prepolymers.

"Aminosilane", "hydroxysilane", "isocyanatosilane", etc. refer to silanes which have a corresponding functional group on the organic residue, in other words, an amino group, a hydroxyl group, an isocyanate group, etc.

The term "polyurethane polymer" comprises all polymers that are produced according to the so-called diisocyanate polyaddition method. The term "polyurethane polymer" also comprises polyurethane polymers having isocyanate groups, such as those that can be obtained from the reaction of polyisocyanates and polyols, and themselves represent polyisocyanates; these are also frequently referred to as prepolymers.

A "primary amino group" is an NH₂ group that is bonded to an organic residue, and a "secondary amino group" is an NH group that is bonded to two organic residues which can also together form part of a ring.

Substance names that begin with "poly", such as polyol, polyamine, or polyisocyanate, refer to substances that formally contain two or more of the functional groups occurring in their name per molecule.

"Amine hydrogen" refers to the hydrogen atoms of primary and secondary amino groups.

"Amine hydrogen equivalent weight" refers to the percentage by weight of a curing agent or an amine per amine hydrogen present in the curing agent or in the amine. "Molecular weight" in the present document is understood as the molar mass (in grams per mol) of a molecule. "Average molecular weight" refers to the number-average molecular weight $M_n$ of an oligomeric or polymeric mixture of molecules, which is usually determined in relation to polystyrene as the standard by GPC. "Room temperature" in the present document refers to a temperature of 23° C.

Component A of the composition according to the invention comprises at least one silane-functional polymer.

The silane-functional polymer preferably has an average molecular weight ranging from 1,000 to 30,000 g/mol, preferably 2,000 to 25,000 g/mol, particularly preferably 3,000 to 20,000 g/mol, and particularly 4,000 to 15,000 g/mol. A polymer of this type enables high strengths with high extensibility.

The silane-functional polymer preferably has predominantly polyoxyalkylene units, particularly preferably polyoxyethylene and/or polyoxypropylene units, in particular polyoxypropylene units. A polymer of this type has particularly low viscosity and enables particularly advantageous extensibility levels.

The silane-functional polymer preferably has at least one, in particular at least two end groups of formula (I).

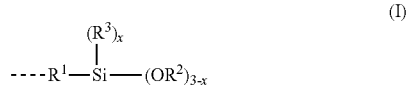

(I)

In this formula, residue $R^1$ stands for a linear or branched alkylene residue or cycloalkylene residue having 1 to 12 C atoms, optionally with aromatic fractions, and optionally with one or more heteroatoms, in particular one or more nitrogen atoms. More particularly, $R^1$ stands for a linear or branched alkylene residue having 1 to 6 C atoms, preferably for methylene or 1,3-propylene, particularly preferably for 1,3-propylene.

Residue $R^2$ stands for an acyl residue or alkyl residue having 1 to 10 C atoms, which optionally has one or more ether oxygens.

More particularly, $R^2$ stands for methyl or ethyl or isopropyl or hepta-3,6-dioxa-1-yl, preferably for methyl or ethyl.

Residue $R^3$ stands for an alkyl residue having 1 to 6 C atoms, particularly for methyl. The subscript x stands for a value of 0 or 1 or 2, particularly for 0.

A silane-functional polymer of this type is highly stable in storage, hydrolyzes rapidly when it comes in contact with moisture, and enables advantageous mechanical properties, in particular high strength with high extensibility.

Within a silane group of formula (I), $R^2$ and $R^3$ each independently stand for the described residues. For example, silane-functional polymers having end groups of formula (I), which have ethoxydimethoxysilane end groups ($R^2$=methyl, $R^2$=methyl, $R^2$=ethyl), are also possible.

The end groups of formula (I) are particularly predominantly bonded to cycloaliphatic residues. A polymer of this type has particularly low viscosity and is particularly lightfast.

Preferably, the silane-functional polymer has 1 to 4, particularly preferably 1 to 3, especially 2 or 3, most preferably 2 end groups of formula (I). A polymer of this type enables good mechanical properties, in particular, high extensibility.

The silane-functional polymer is preferably free of isocyanate groups. A silane-functional polymer of this type is toxicologically advantageous.

A suitable silane-functional polymer in a first embodiment is a silane-functional polymer P1, which can be obtained by reacting a polyurethane polymer which has isocyanate groups with at least one silane which has at least one group that is reactive toward isocyanate groups.

This reaction is preferably carried out in a 1:1 stoichiometric ratio of groups that are reactive toward isocyanate groups to isocyanate groups, or with a slight excess of groups that are reactive toward isocyanate groups, so that the resulting silane-functional polymer P1 is free of isocyanate groups. The reaction is preferably carried out at a temperature within a range of 20° C. to 120° C., in particular 50° C. to 100° C., optionally in the presence of at least one catalyst.

The silane, which has at least one group that is reactive toward isocyanate groups, can also be used in principle, if not preferably, in a hypostoichiometric quantity in relation to the isocyanate groups of the polyurethane polymer, in which case a silane-functional polymer is obtained which contains both silane groups and isocyanate groups.

The silane which has at least one group that is reactive toward isocyanate groups is particularly a mercaptosilane, a hydroxysilane or an aminosilane, preferably an aminosilane.

Suitable aminosilanes include primary aminosilanes, in particular 3-aminopropyltrimethoxysilane and 3-aminopropyldimethoxymethylsilane, and also secondary aminosilanes, in particular 3-(n-butylamino)propyl-trimethoxysilane, 3-(phenylamino)propyl-trimethoxysilane, bis(trimethoxysilylpropyl)amine, the products of the Michael-type addition of primary aminosilanes, in particular 3-aminopropyl-trimethoxysilane and 3-aminopropyldimethoxymethylsilane, to Michael acceptors such as acrylonitrile, (meth)acrylic acid esters, (meth)acrylic acid amides, maleic acid esters and maleic acid amides, fumaric acid diesters, citraconic acid diesters and itaconic acid diesters; and analogues of the stated aminosilanes with ethoxy groups in place of the methoxy groups on the silicon.

Secondary aminosilanes are preferred for the production of a silane-functional polymer P1.

Especially preferred are the products of the Michael-type addition, in particular with acrylates such as n-butyl acrylate, 2-ethylhexyl acrylate, lauryl acrylate or isobornyl acrylate, and particularly with maleic acid dialkyl esters. Preferred in particular are the products of the Michael-type addition of 3-aminopropyltrimethoxysilane, 3-aminopropyltriethoxysilane, 3-aminopropyldimethoxymethylsilane and 3-aminopropyldiethoxymethylsilane with maleic acid dialkyl esters, in particular with maleic acid diethyl esters.

Most preferred is N-(3-trimethoxysilyl-propyl)-aminosuccinic acid diethyl ester. Silane-functional polymers P1 that enable particularly high extensibility levels can be obtained using these aminosilanes.

In the present document, the term "Michael acceptor" refers to compounds that are capable of entering into addition reactions that are nucleophilic in a manner similar to the Michael addition (hetero-Michael addition) with primary amino groups, due to the double bonds contained in said compounds, which are activated by electron acceptor residues.

A polyurethane polymer having isocyanate groups which is suitable for producing a silane-functional polymer P1 can be obtained particularly by reacting at least one polyol with at least one polyisocyanate, in particular at least one diisocyanate.

This reaction can be carried out by bringing the polyol and the polyisocyanate to reaction by routine methods, in particular at temperatures of 50° C. to 100° C., optionally with the use of suitable catalysts, wherein the polyisocyanate is metered in in such a way that the isocyanate groups thereof are present in stoichiometric excess in relation to the hydroxyl groups of the polyol. More particularly, the excess of polyisocyanate is selected such that, in the resulting polyurethane polymer, once all the hydroxyl groups have been converted, a concentration of free isocyanate groups of 0.1 to 5 wt %, preferably 0.1 to 2.5 wt %, particularly preferably 0.2 to 1 wt %, in relation to the polymer as a whole remains. Preferred are polyurethane polymers having the stated concentration of free isocyanate groups, which polymers are obtained from the reaction of diisocyanates with high-molecular weight diols in an NCO/OH ratio of 1.5 to 2.2, in particular 1.8 to 2.0. The polyurethane polymer can optionally be produced using plasticizers, wherein the plasticizers that are used contain no groups that are reactive toward isocyanates.

Suitable polyols for producing a polyurethane polymer containing isocyanate groups are particularly the following commercially available polyols or any mixtures thereof:

polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized with the aid of a starter molecule having two or more active hydrogen atoms such as water, ammonia or compounds having a plurality of OH or NH groups, for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecandediols, 1,3- and 1,4-cyclohexane dimethanol, bisphenol A, hydrogenated bisphenol A, 1,1,1-trimethylolethane, 1,1,1-trimethylolpropane, glycerol, aniline, and mixtures of the aforementioned compounds. Preferred are polyoxyalkylene polyols, which have a low degree of unsaturation (measured according to ASTM D-2849-69 and indicated in unsaturation milliequivalents per gram of polyol (mEq/g)), produced, for example, with the help of so-called double metal cyanide complex catalysts (DMC catalysts).

Particularly suitable are polyoxyalkylenediols or polyoxyalkylenetriols, in particular polyoxyethylene- and polyoxypropylenediols and -triols.

Further particularly suitable are so-called ethylene oxide-terminated (EOend-capped) polyoxypropylene polyols. The latter are polyoxyethylene polyoxypropylene mixed polyols, which are obtained, for example, by subjecting polyoxypropylene polyols to further alkoxylation upon completion of the polypropoxylation reaction with ethylene oxide, and which therefore have primary hydroxyl groups.

Styrene-acrylonitrile-grafted or acrylonitrile-methylmethacrylate-grafted polyether polyols.

Polyester polyols, also called oligoesterols, produced according to known methods, in particular by polycondensation of hydroxycarboxylic acids or by polycondensation of aliphatic and/or aromatic polycarboxylic acids having divalent or polyvalent alcohols.

Particularly suitable polyester polyols are those that are produced from divalent to trivalent, particularly divalent alcohols, such as ethylene glycol, diethylene glycol, propylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexane dimethanol, dimeric fatty acid diol (dimer diol), hydroxypivalic acid neopentyl glycol ester, glycerol, 1,1,1-trimethylolpropane or mixtures of the aforementioned alcohols with organic dicarboxylic or tricarboxylic acids, in particular dicarboxylic acids, or the anhydrides or esters thereof, for example succinic acid, glutaric acid, adipic acid, trimethyladipic acid, suberic acid, azelaic acid, sebacic acid, dodecane dicarboxylic acid, maleic acid, fumaric acid, dimer fatty acid, phthalic acid, phthalic acid anhydride, isophthalic acid, terephthalic acid, dimethyl terephthalate, hexahydrophthalic acid, trimellitic acid anhydride, or mixtures of the aforementioned acids, and polyester polyols from lactones, for example from ε-caprolactone, and starters, such as the aforementioned divalent or trivalent alcohols.

Particularly suitable polyester polyols are polyester diols.

Polycarbonate polyols, such as are obtained by reacting, for example, the aforementioned alcohols—used for synthesizing the polyester polyols—with dialkyl carbonates, diaryl carbonates or phosgene.

Block copolymers which carry at least two hydroxyl groups, and which have at least two different blocks having a polyether, polyester and/or polycarbonate structure of the type described above, in particular polyether polyester polyols.

Polyacrylate polyols and polymethacrylate polyols.

Polyhydroxyfunctional fats and oils, for example natural fats and oils, in particular castor oil; or polyols obtained by chemical modification of natural fats and oils—so-called oleochemical polyols, for example oils unsaturated by epoxidation, and epoxy polyesters and/or epoxy polyethers obtained by subsequent ring cleavage using carboxylic acids and/or alcohols, or polyols obtained by hydroformylation and hydrogenation of unsaturated oils; or polyols obtained from natural fats and oils by degradation processes such as alcoholysis or ozonolysis and subsequent chemical bonding, for example by the transesterification or dimerization of the degradation products thus obtained or derivatives thereof. Suitable degradation products of natural fats and oils are, in particular, fatty acids and fatty alcohols, and fatty acid esters, in particular the methyl esters (FAME), which can be derivatized, for example, by hydroformylation and hydrogenation to form hydroxy fatty acid esters.

Polyhydrocarbon polyols, also called oligohydrocarbonols, for example polyhydroxy functional polyolefins, polyisobutylenes, polyisoprenes; polyhydroxy functional ethylene-propylene, ethylene-butylene or ethylene-propylene diene copolymers, such as those produced by Kraton Polymers; polyhydroxyfunctional polymers of dienes, in particular of 1,3-butadiene, which can particularly also be produced by anionic polymerization; polyhydroxy-functional copolymers of dienes, such as 1,3-butadiene or diene mixtures and vinyl monomers such as styrene, acrylonitrile, vinyl chloride, vinyl acetate, vinyl alcohol, isobutylene and isoprene, for example, polyhydroxy functional acrylonitrile/butadiene copolymers, such as those that can be produced, for example, from epoxides or amino alcohols and carboxyl-terminated acrylonitrile/butadiene copolymers (commercially available, for example, under the name Hypro® (previously Hycar®), CTBN and CTBNX and ETBN from Nanoresins AG, Germany, or Emerald Performance Materials LLC); and hydrogenated polyhydroxy-functional polymers or copolymers of dienes.

Preferred polyols are polyoxyalkylene polyols, polyester polyols, polycarbonate polyols and polyacrylate polyols. Particularly preferred are polyoxyalkylene polyols. Preferred polyoxyalkylene polyols are polyoxypropylene polyols and polyoxyethylene-polyoxypropylene mixed polyols.

The polyol preferably has an average molecular weight ranging from 1,000 to 20,000 g/mol, particularly preferably 2,000 to 15,000 g/mol.

The polyol is preferably a diol.

In addition to these stated polyols, small quantities of low-molecular-weight divalent or polyvalent alcohols, such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexane dimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher-valency alcohols, low-molecular alkoxylation products of the aforementioned divalent and polyvalent alcohols, and mixtures of the aforementioned alcohols can be used in the production of the polyurethane polymer having isocyanate groups.

Suitable polyisocyanates for the production of a polyurethane polymer having isocyanate groups are particularly the following commercially available polyisocyanates or any mixtures thereof:

Aliphatic isocyanates, in particular 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane-1,3 and 1,4-diisocyanate, 1-methyl-2,4- and -2,6-diisocyanato cyclohexane and any mixtures of these isomers (HTDI or $H_6$TDI), 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), tetramethyl-1,3- and -1,4-xylylene diisocyanate (m- and p-TMXDI), bis-(1-isocyanato-1-methylethyl)naphthalene, dimer and trimer fatty acid isocyanates such as 3,6-bis-(9-isocyanatononyl)-4,5-di-(1-heptenyl)cyclohexene (dimeryl diisocyanate) and $\alpha,\alpha,\alpha',\alpha',\alpha'',\alpha''$-hexamethyl-1,3,5-mesitylene triisocyanate, and also aromatic isocyanates, in particular 2,4- and 2,6-toluylene diisocyanate and any mixtures of these isomers (TDI), 4,4'-, 2,4'- and 2,2'-diphenylmethane diisocyanate and any mixtures of these isomers (MDI), mixtures of MDI and MDI homologues (polymeric MDI or PMDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane and tris-(4-isocyanatophenyl)thiophosphate, and oligomers and polymers of the aforementioned isocyanates, and any mixtures of the aforementioned isocyanates.

Diisocyanates are preferred as polyisocyanates. Particularly preferred are IPDI, HDI, MDI and TDI, in particular IPDI. Silane-functional polymers P1 which have low viscosity and enable advantageous mechanical properties and a low tendency toward yellowing under the influence of light can be obtained by using IPDI.

Suitable silane-functional polymers P1 are commercially available, for example, under the tradenames Polymer ST from Hanse Chemie AG, Germany, for example as polymer ST50, and under the tradename Desmoseal® from Bayer MaterialScience AG, Germany.

A suitable silane-functional polymer in a further embodiment is a silane-functional polymer P2, which can be obtained by reacting a polymer having functional end groups that are reactive toward isocyanate groups, in particular hydroxyl groups, mercapto groups and/or amino groups, with at least one isocyanatosilane. This reaction is preferably carried out in a 1:1 stoichiometric ratio of isocyanate groups to the functional end groups that are reactive toward isocyanate groups, or with a slight excess of the functional end groups that are reactive toward isocyanate groups, so that the resulting silane-functional polymer P2 is free of isocyanate groups. The reaction is preferably carried out at a temperature within a range of 20° C. to 120° C., in particular 50° C. to 100° C., optionally in the presence of at least one suitable catalyst. Suitable isocyanatosilanes are particularly isocyanatomethyl trimethoxysilane, isocyanatomethyl dimethoxymethylsilane, 3-isocyanatopropyl trimethoxysilane, 3-isocyanatopropyl dimethoxymethylsilane; and the analogues thereof with ethoxy groups in place of the methoxy groups on the silicon.

The polymer having functional end groups that are reactive toward isocyanate groups preferably has hydroxyl groups as functional end groups that are reactive toward isocyanate groups.

Suitable polymers that have hydroxyl groups include the already stated polyols, preferably high-molecular weight polyoxyalkylene polyols, in particular polyoxypropylenediols having a degree of unsaturation of less than 0.02 mEq/g and an average molecular weight ranging from 2000 to 20,000 g/mol, in particular 4000 to 15,000 g/mol.

Further suitable polymers having hydroxyl groups are polyurethane polymers that have hydroxyl end groups. These can be obtained, like the polyurethane polymers having isocyanate groups described above, by reacting at least one polyisocyanate with at least one polyol; however, the polyol is metered in such that the hydroxyl groups thereof are present in stoichiometric excess in relation to the isocyanate groups of the polyisocyanate. A ratio of hydroxyl groups to isocyanate groups of 1.3:1 to 4:1, in particular of 1.8:1 to 3:1 is preferred.

The same polyols and polyisocyanates that have already been mentioned as suitable for producing a polyurethane polymer having isocyanate groups are also suitable for this reaction.

Suitable silane-functional polymers P2 are commercially available, for example, under the tradenames SPUR+® 1010LM, 1015LM and 1050MM from Momentive, USA, and under the tradenames Geniosil® STP-E10, STP-E15, STP-E30 and STP-E35 from Wacker Chemie AG, Germany.

A suitable silane-functional polymer in a further embodiment is a silane-functional polymer P3, which can be obtained by a hydrosilylation reaction of polymers having terminal double bonds, in particular poly(meth)acrylate polymers and allyl-terminated polyether polymers, described, for example, in U.S. Pat. No. 3,971,751 and U.S. Pat. No. 6,207,766, the entire disclosure of which is herewith included.

Suitable silane-functional polymers P3 are commercially available, for example, under the tradenames MS Polymer™ S203H, 5303H, S227, S810, MA903 and S943, Silyl™ SAX220, SAX350, SAX400 and SAX725, Silyl™ SAT350 and SAT400, and XMAP™ SA100S and SA310S from Kaneka Corp., Japan and under the tradenames Excestar® S2410, S2420, S3430, S3630, W2450 and MSX931 from the Asahi Glass Co., Ltd., Japan.

Silane-functional polymers P1 are preferred as the silane-functional polymers. Particularly rapid curing and particularly high mechanical strengths are achieved by using these polymers.

The silane-functional polymer is preferably present in a quantity of 10 to 85 wt %, particularly preferably 20 to 80 wt %, in particular 30 to 75 wt %, in relation to the composition as a whole.

Component A of the composition according to the invention further comprises at least one epoxy resin.

Suitable epoxy resins are routine industrial epoxy resins. These can be obtained in a known manner and method, for example by oxidizing the corresponding olefins or by reacting epichlorohydrin with the corresponding polyols, polyphenols or amines. Particularly suitable epoxy resins are so-called polyepoxy liquid resins, hereinafter referred to as "liquid resin". These have a glass transition temperature of less than 25° C.

So-called solid resins which have a glass transition temperature above 25° C. and can be ground to powders that are loose at 25° C. may also be used as the epoxy resin.

Suitable epoxy resins are, in particular, aromatic epoxy resins, in particular the glycidylization products of:
 bisphenol A, bisphenol F or bisphenol A/F, in which A stands for acetone and F stands for formaldehyde, and which served as educts for the production of said bisphenols. In the case of bisphenol F, positional isomers can also be present, in particular derived from 2,4'- and 2,2'-hydroxyphenyl methane.
 dihydroxybenzene derivatives such as resorcinol, hydroquinone, and pyrocatechol;
 other bisphenols or polyphenols such as bis-(4-hydroxy-3-methylphenyl)methane, 2,2-bis-(4-hydroxy-3-methylphenyl)propane (bisphenol C), bis-(3,5-dimethyl-4-hydroxyphenyl)methane, 2,2-bis-(3,5-dimethyl-4-hydroxyphenyl)propane, 2,2-bis-(3,5-dibromo-4-hydroxyphenyl)propane, 2,2-bis-(4-hydroxy-3-tert. butylphenyl)propane, 2,2-bis-(4-hydroxyphenyl)butane (bisphenol B), 3,3-bis-(4-hydroxyphenyl)pentane, 3,4-bis-(4-hydroxyphenyl)hexane, 4,4-bis-(4-hydroxyphenyl)heptane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane (bisphenol Z), 1,1-bis-(4-hydroxyphenyl)-3,3,5-trimethylcyclohexane (bisphenol TMC), 1,1-bis-(4-hydroxyphenyl)-1-phenylethane, 1,4-bis-[2-(4-hydroxyphenyl)-2-propyl]benzene (bisphenol P), 1,3-bis-[2-(4-hydroxyphenyl)-2-propyl]benzene (bisphenol M), 4,4'-dihydroxydiphenyl (DOD), 4,4'-dihydroxybenzophenone, bis-(2-hydroxynaphth-1-yl)methane, bis-(4-hydroxynaphth-1-yl)methane, 1,5-dihydroxynaphthalene, tris(4-hydroxyphenyl)methane, 1,1,2,2-tetrakis(4-hydroxyphenyl)ethane, bis-(4-hydroxyphenyl)ether and bis-(4-hydroxyphenyl)sulfone;
 condensation products of phenols with formaldehyde, which are obtained under acid conditions, such as phenol novolacs or cresol novolacs, also called bisphenol F novolacs; and
 aromatic amines, such as aniline, toluidine, 4-aminophenol, 4,4'-methylene diphenyldiamine, 4,4'-methylene diphenyldi-(N-methyl)amine, 4,4'-[1,4-phenylene-bis (1-methylethylidene)]bisaniline (bisaniline P), 4,4'-[1, 3-phenylene-bis(1-methylethylidene)]bisaniline (bisaniline M).

Additional suitable epoxy resins include aliphatic or cycloaliphatic polyepoxides, in particular
 glycidyl ethers of a saturated or unsaturated, branched or unbranched, cyclic or open-chain $C_2$- to $C_{30}$ diol, in particular ethylene glycol, propylene glycol, butylene glycol, hexanediol, octanediol, polypropylene glycol, dimethylol cyclohexane, neopentyl glycol or dibromoneopentyl glycol;
 glycidyl ethers of a trifunctional or tetrafunctional, saturated or unsaturated, branched or unbranched, cyclic or open-chain polyol, in particular castor oil, trimethylol propane, trimethylol ethane, pentaerythrol, sorbitol or glycerol, and alkoxylated glycerol or alkoxylated trimethylol propane;
 hydrogenated bisphenol A, F or A/F liquid resins, or the glycidylization products of hydrogenated bisphenol A, F or A/F;
 N-glycidyl derivatives of amides or heterocyclic nitrogen bases, such as triglycidyl cyanurate and triglycidyl isocyanurate, and reaction products of epichlorohydrin and hydantoin.
 Epoxy resins from the oxidation of olefins, in particular vinyl cyclohexene, dicyclopentadiene, cyclohexadiene, cyclododecadiene, cyclododecatriene, isoprene, 1,5-hexadiene, butadiene, polybutadiene or divinyl benzene.

Particularly preferred epoxy resins are bisphenol A-, bisphenol F- or bisphenol A/F-diglycidyl liquid resins, such as are commercially available, for example, from Dow, Huntsman and Momentive. These liquid resins have a low viscosity for epoxy resins and high strengths in the cured state. They can optionally be present in combination with other epoxy resins.

The epoxy resin can also contain fractions of monofunctional epoxides, so-called reactive diluents, particularly phenylglycidyl ether, cresylglycidyl ether, benzylglycidyl ether, p-n-butyl-phenylglycidyl ether, p-tert butyl-phenylglycidyl ether, nonylphenylglycidyl ether, allylglycidyl ether, butylglycidyl ether, hexylglycidyl ether, 2-ethylhexylglycidyl ether, and glycidyl ethers of natural alcohols, for example $C_8$ to $C_{10}$ alkylglycidyl ethers or $C_{12}$ to $C_{14}$ alkylglycidyl ethers.

The ratio of the silane-functional polymer to the epoxy resin can vary over a broad range. A high fraction of silane-functional polymer results in compositions of particularly high extensibility, whereas a high fraction of epoxy resin results in compositions of particularly high strengths.

The weight ratio of silane-functional polymer to epoxy resin preferably ranges from 10:1 to 1:3.

More particularly, the weight ratio of silane-functional polymer to epoxy resin ranges from 8:1 to 1:2, particularly preferably from 5:1 to 1:1. A composition of this type enables very high extensibility with high strength and has pronounced elastic characteristics with excellent resilience.

Component B of the composition according to the invention comprises at least one amine-epoxy adduct which has at least 3 amine hydrogens.

The amine-epoxy adduct can particularly be obtained by reacting at least one polyamine with at least one epoxide, in particular a monoepoxide or diepoxide. In this case, the product of this reaction without further processing is referred to as the "amine-epoxy adduct"; this product typically contains fractions of unreacted polyamine. The amine-epoxy adduct is preferably produced by mixing the polyamine with the epoxide, and is made to react at a temperature ranging from 20 to 150° C., preferably 50 to 100° C.

The polyamine and the epoxide are used in quantities such that the amino groups are present in excess in relation to the epoxide groups.

When a monoepoxide is used as the epoxide, the amine-epoxy adduct can particularly be obtained by reacting the polyamine with the monoepoxide in a molar ratio ranging from 1/0.8 to 1/1.5, more particularly from 1/0.9 to 1/1.2.

When a diepoxide is used as the epoxide, the amine-epoxy adduct can particularly be obtained by reacting the polyamine with the diepoxide in a molar ratio ranging from 2/0.8 to 2/1.2, more particularly from 2/0.9 to 2/1.1.

In a preferred embodiment of the invention, the amine-epoxy adduct is a reaction product of at least one polyamine and at least one monoepoxide.

Suitable polyamines for this purpose are particularly polyamines having two primary amino groups, in particular the following:

aliphatic, cycloaliphatic or arylaliphatic primary diamines, in particular 2,2-dimethyl-1,3-propanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2- 1,3- and 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (=isophoronediamine or IPD), 2- and 4-methyl-1,3-diaminocyclohexane and mixtures thereof, 1,3- and 1,4-bis(aminomethyl)-cyclohexane, 2,5(2,6)-bis(aminomethyl)bicyclo[2.2.1]heptane (NBDA), 3(4), 8(9)-bis(aminomethyl)tricyclo [5.2.1.0$^{2,6}$]decane, 1,4-diamino-2,2,6-trimethylcyclohexane (TMCDA), 1,8-menthanediamine, 3,9-bis(3-aminopropyl)-2,4,8,10-tetraoxaspiro[5.5]undecane and 1,3- and 1,4-bis (aminomethyl)-benzene;

polyamines having secondary amino groups, with two primary aliphatic amino groups, in particular 3-(2-aminoethyl)aminopropylamine, bis(hexamethylene)-triamine (BHMT), diethylenetriamine (DETA), triethylenetetramine (TETA), tetraethylenepentamine (TEPA), pentaethylenehexamine (PEHA) and higher homologues of linear polyethyleneamines such as polyethylene polyamine having 5 to 7 ethyleneamine units (so-called "higher ethylene polyamines", HEPA), products of the multiple cyanoethylation or cyanobutylation and subsequent hydrogenation of primary diamines and polyamines having at least two primary amino groups, such as dipropylenetriamine (DPTA), N-(2-aminoethyl)-1,3-propanediamine (N3-amine), N,N'-bis(3-aminopropyl)ethylenediamine (N4-amine), N,N'-bis(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediamine and N,N'-bis(3-amino-1-ethylpropyl)-2-methyl-1,5-pentanediamine;

polyamines having tertiary amino groups, with two primary aliphatic amino groups, in particular N,N'-bis (aminopropyl)-piperazine, N,N-bis(3-am inopropyl)methylamine, N,N-bis(3-aminopropyl)ethylamine, N, N-bis(3-am inopropyl)propylamine, N,N-bis(3-am inopropyl)cyclohexylamine, N,N-bis(3-aminopropyl)-2-ethylhexylamine, and products of the double cyanoethylation and subsequent reduction of fatty amines, which are derived from natural fatty acids, such as N,N-bis(3-aminopropyl)dodecylamine and N,N-bis(3-aminopropyl)tallow alkylamine, available as Triameen® Y12D and Triameen® YT (Akzo Nobel);

aliphatic primary diamines containing ether groups, in particular bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, bis(3-aminopropyl)polytetrahydrofurans and other polytetrahydrofuran diamines, cycloaliphatic ether group-containing diamines from the propoxylation and subsequent amination of 1,4-dimethylolcyclohexane, available particularly as Jeffamine® RFD-270 (Huntsman), and polyoxyalkylenediamines, which are typically products from the amination of polyoxyalkylenediols and are available, for example, under the name Jeffamine® (Huntsman), under the name Polyetheramine (BASF) or under the name PC Amine® (Nitroil). Particularly suitable polyoxypropylenediamines are Jeffamine® D-230, Jeffamine® D-400, Jeffamine® D-2000, Jeffamine® EDR-104, Jeffamine® EDR-148 and Jeffamine® EDR-176, and corresponding amines from BASF or Nitroil, and particularly suitable polyoxyethylenediamines are Jeffamine® ED-600, Jeffamine® ED-900 and Jeffamine® ED-2003.

1,5-diamino-2-methylpentane, 2,2,4- and 2,4,4-trimethylhexamethylenediamine, diethylenetriamine and polyoxypropylenediamines having an average molecular weight ranging from 200 to 300 g/mol are particularly preferred.

The monoepoxide is preferably an aromatic monoepoxide, in particular the glycidyl ether of a phenol, in particular the glycidyl ether of phenol, cresol, tert.butyl phenol or cardanol.

The monoepoxide is particularly preferably cresylglycidyl ether. Suitable cresylglycidyl ethers include all isomeric cresylglycidyl ethers and mixtures thereof, particularly commercially available types, especially Araldite® DY-K (Huntsman), POlypox™ R6 (Dow), Heloxy™ KR (Momentive) or Erisys® GE-10 (Emerald Performance Materials). An amine-epoxy adduct of this type has relatively low viscosity and is readily compatible with component A.

A particularly preferred amine-epoxy adduct is the reaction product of 1,5-diamino-2-methylpentane or a mixture of 2,2,4- and 2,4,4-trimethylhexamethylenediamine with cresylglycidyl ether in a molar ratio of 1/0.8 to 1/1.5, more particularly of 1/0.9 to 1/1.2.

In a further preferred embodiment of the invention, the amine-epoxy adduct is a reaction product of at least one polyamine and at least one diepoxide.

The diepoxide is preferably an aromatic diepoxide, in particular a bisphenol A-, bisphenol F- or bisphenol A/F diglycidyl liquid resin.

Suitable polyamines for this purpose are particularly the above-mentioned polyamines having two primary amino groups, and also polyamines having one primary and one secondary amino group, in particular N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, N-(2-aminoethyl)piperazine, N-methyl-1,3-propanediamine, N-butyl-1,3-propanediamine, N-(2-ethylhexyl)-1,3-propanediamine, N-cyclohexyl-1,3-propanediamine, 3-methylamino-1-pentylamine, 3-ethylamino-1-pentylamine, 3-cyclohexylamino-1-pentylamine, fatty diamines, in particular N-cocoalkyl-1,3-propanediamine, available, for example, as Duomeen® CD (Akzo Nobel), and also products from the partial reductive alkylation of primary diamines with aldehydes or ketones.

Preferred polyamines for reaction with at least one monoepoxide or with at least one diepoxide are selected from the group consisting of 1,5-diamino-2-methylpentane, 2,2,4- and 2,4,4-trimethylhexamethylenediamine, isophoronediamine, 1,3- and 1,4-bis(aminomethyl)cyclohexane, 1,3-bis(aminomethyl)benzene, diethylenetriamine, triethylenetetramine, tetraethylenepentamine, pentaethylenehexamine, N-(2-aminoethyl)-1,3-propanediamine (N3-amine), N,N'-bis(3-aminopropyl)ethylenediamine (N4-amine), polyoxypropylenediamines and polyoxyethylenediamines having an average molecular weight ranging from 200 to 3000 g/mol, in particular the types Jeffamine® D-230, Jeffamine® D-400, Jeffamine® D-2000, Jeffamine® EDR-104, Jeffamine® EDR-148, Jeffamine® EDR-176, Jeffamine® ED-600, Jeffamine® ED-900 and Jeffamine® ED-2003, and corresponding amines from BASF or Nitroil. Particularly high strength and stability are obtained using these polyamines.

Of the above, the following are particularly preferred: 1,5-diamino-2-methylpentane, 2,2,4- and 2,4,4-trimethylhexamethylenediamine, isophoronediamine, 1,3- and 1,4-bis(aminomethyl)cyclohexane, 1,4-bis(aminomethyl)benzene and polyoxypropylenediamines having a molecular weight ranging from 200 to 300 g/mol, in particular Jeffamine® D-230 or corresponding amines from BASF or Nitroil. With these polyamines, a particularly dry and uniform surface is also obtained.

A particularly preferred reaction product is that from a polyoxypropylenediamine having a molecular weight ranging from 200 to 300 g/mol and a bisphenol A diglycidyl liquid resin in a molar ratio ranging from 2/0.9 to 2/1.1.

Component B preferably contains at least as much water as is required for crosslinking the silane-functional polymer of component A, especially a multiple thereof.

Component B very preferably contains 5 to 30, especially 5 to 25, wt % water. In one aspect of the invention, component B particularly contains at least 10 wt % water.

When a component B of this type is used, many-fold the amount of water that is required by the silane-functional polymer for curing is typically added to the mixed composition. As a result, the composition cures rapidly once the two components are mixed, regardless of the prevailing atmospheric humidity.

In a preferred embodiment of the invention, component B also comprises at least one polyamine PA having at least two primary amino groups, which is not identical to the polyamines used for producing the amine-epoxy adduct. A component B of this type particularly represents an aqueous curing agent for epoxy resins, and preferably contains at least 10 wt %, in particular at least 15 wt %, water.

An aqueous curing agent for epoxy resins is also referred to as a "water-based curing agent" or a "water-dilutable curing agent" for epoxy resins.

The water in a component B of this type is preferably present in the form of a water-in-oil or an oil-in-water emulsion.

A component B in the form of an aqueous curing agent for epoxy resins is unexpectedly very readily miscible with component A, without compatibility problems occurring. The two components can be very readily mixed using simple mixers, resulting in a visually homogeneous composition which can be readily applied, and which strengthens rapidly and cures largely independently of climatic conditions, in particular independently of the prevailing atmospheric humidity. Unexpectedly, the mixed and/or cured composition in this case exhibits only low shrinkage that is not critical to functioning.

The polyamine PA having at least two primary amino groups is particularly selected from the group consisting of 1,5-diamino-2-methylpentane, 2-butyl-2-ethyl-1,5-pentanediamine, 1,6-hexanediamine, 2,5-dimethyl-1,6-hexanediamine, 2,2,4- and 2,4,4-trimethylhexamethylenediamine, 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis(4-aminocyclohexyl)methane, bis(4-amino-3-methylcyclohexyl)methane, isophoronediamine, 2- and 4-methyl-1,3-diaminocyclohexane and mixtures thereof, 1,3- and 1,4-bis(aminomethyl)cyclohexane, 1,3-bis(aminomethyl)benzene, 3-(2-aminoethyl)aminopropylamine, bis(hexamethylene)triamine, diethylenetriamine, triethylenetetramine, tetraethylenepentamine, pentaethylenehexamine, dipropylenetriamine, N-(2-aminoethyl)-1,3-propanediamine, N,N'-bis(3-aminopropyl)ethylenediamine, N,N'-bis(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediamine, N,N'-bis(3-amino-1-ethylpropyl)-2-methyl-1,5-pentanediamine and polyoxypropylenediamines having an average molecular weight ranging from 200 to 300 g/mol.

A component B of this type enables particularly rapid curing and particularly high strengths.

Preferred polyamines of this type are 1,5-diamino-2-methylpentane, 1,6-hexanediamine, 2,2,4- and 2,4,4-trimethylhexamethylenediamine, 1,7-heptanediamine, 1,8-octanediamine, isophoronediamine, 1,3- and 1,4-bis(aminomethyl)cyclohexane, 1,3-bis(aminomethyl)benzene, 3-(2-aminoethyl)aminopropylamine, bis(hexamethylene)triamine, diethylenetriamine and N-(2-eminoethyl)-1,3-propanediamine. Particularly preferred are 1,5-diamino-2-methylpentane, 2,2,4- and 2,4,4- trimethylhexamethylenediamine, isophoronediamine, 1,3- and 1,4-bis(aminomethyl)cyclohexane and 1,3-bis(aminomethyl)benzene.

When these polyamines are used, a particularly homogeneous, non-tacky surface is obtained after curing.

In addition to the stated polyamine PA, component B also particularly preferably comprises at least one amine hydrogen-containing emulsifier. An emulsifier of this type improves the compatibility with water of hydrophobic fractions of the composition, and is incorporated into the cured epoxy resin during curing.

A particularly suitable amine hydrogen-containing emulsifier is a reaction product of at least one diepoxide, at least one fatty amine and at least one hydrophilic polyamine, particularly in a molar ratio of approximately 1:1:1. Suitable hydrophilic polyamines include particularly polyoxyalkylenediamines, in particular polyoxyethylenediamines, and polyalkyleneamines, in particular N4-amine, TETA, TEPA and PEHA.

A further suitable amine hydrogen-containing emulsifier is, in particular, a reaction product of at least one polyethylene glycol, at least one diepoxide and at least one primary diamine, particularly in a molar ratio of approximately 1:at least 2:at least 2.

A further suitable amine hydrogen-containing emulsifier is particularly a reaction product of at least one diepoxide and at least one polyalkyleneamine, particularly in a molar ratio of approximately 1:at least 2.

A further suitable amine hydrogen-containing emulsifier is particularly a reaction product of at least one polyethylene glycol monoglycidyl ether, at least one polyamine having two primary amino groups, and at least one hydrophobic monoglycidyl ether, in particular butyl- or cresylglycidyl ether, particularly in a molar ratio of approximately 1:at least 1:1.

"Approximately" in the context of the molar ratios mentioned in this document refers to a deviation of up to ±10%.

Particularly preferred is a component B, which comprises as an amine hydrogen-containing emulsifier
  a reaction product of at least one diepoxide, at least one fatty amine and at least one polyoxyalkylenediamine in a molar ratio of approximately 1:1:1,
and/or
  a reaction product of at least one diepoxide, at least one fatty amine and at least one polyalkyleneamine in a molar ratio of approximately 1:1:1.

These reaction products have a particularly advantageous emulsifying effect, whereby component B is particularly highly compatible with component A. "Highly compatible" refers to the property that a visually homogeneous, streak-free composition is obtained from the two components after only a short mixing time using simple mixers, which composition shows no signs of demixing, even after curing.

Suitable diepoxides are particularly bisphenol A-, bisphenol F- or bisphenol A/F-diglycidyl liquid resins.

Suitable fatty amines are particularly dodecylamine, tetradecylamine, hexadecylamine, octadecylamine, eicosylamine, docosylamine, and fatty amines derived from natural fatty acid mixtures, particularly cocoalkylamine, $C_{16}$-$C_{22}$ alkylamine, soybean alkylamine, oleylamine and tallow alkylamine, available, for example, under the tradenames Armeen® (Akzo Nobel) or Rofamin® (Ecogreen Oleochemicals), in particular Armeen® 12D, Armeen® 18D, Armeen® CD, Armeen® HT, Armeen® M, Armeen® OD, Armeen® OVD and Armeen® TD, and Rofamin® KD, Rofamin® LD, Rofamin® STD, Rofamin® TD, Rofamin® RD, Rofamin® TD40, Rofamin® OD80, Rofamin® OD85 and Rofamin® OD90, and N-dodecyl-1,3-propanediamine, N-cocoalkyl-1,3-propanediamine, N-oleyl-1,3-propanediamine, N-soybean alkyl-1,3-propanediamine, N-tallow alkyl-1,3-propanediamine or N—($C_{16-22}$-alkyl)-1,3-propanediamine, particularly available as Duomeen® CD, Duomeen® M, Duomeen® O, Duomeen® OV, or Duomeen® T (Akzo Nobel), and also triamines and tetramines derived from fatty amines, in particular cocoalkyldipropylenetriamine, oleyldipropylenetriamine, tallow alkyldipropylenetriamine, oleyltripropylenetetramine and tallow alkyltripropylenetetramine, available, for example, as Triameen® C, Triameen® OV, Triameen® T, Tetrameen® OV and Tetrameen® T (Akzo Nobel). Of the above, the monoamines and diamines, in particular cocoalkylamine and N-cocoalkyl-1,3-propanediamine, are preferred.

Suitable polyoxyalkylenediamines are particularly those based on propoxylated polyethylene glycol having an average molecular weight ranging from 500 to 3000 g/mol, in particular the types Jeffamine® ED-600, Jeffamine® ED-900 and Jeffamine® ED-2003 (Huntsman).

Suitable polyalkyleneamines are particularly triethylenetetramine, tetraethylenepentamine, pentaethylenehexamine and N,N'-bis(3-aminopropyl)ethylenediamine.

Most preferred is a component B comprising
  at least 10 wt % water,
  at least one reaction product of at least one diepoxide, at least one fatty amine and at least one polyoxyalkylenediamine in a molar ratio of approximately 1:1:1,
  at least one reaction product of at least one diepoxide, at least one fatty amine and at least one polyalkyleneamine in a molar ratio of approximately 1:1:1,
  at least one reaction product of at least one diepoxide and at least one polyoxypropylenediamine having an average molecular weight ranging from 200 to 300 g/mol in a molar ratio of approximately 1:2, and
  at least one polyamine PA having at least two primary amino groups.

A component B of this type represents an aqueous curing agent for epoxy resins which has excellent stability in storage even at temperatures below freezing. It is especially readily miscible with component A, rapidly resulting in a visually homogeneous composition which can be readily applied, strengthens rapidly and cures largely independently of climatic conditions, in particular independently of the prevailing atmospheric humidity. The mixed and/or cured composition unexpectedly exhibits particularly low shrinkage which is not critical to its functioning. The cured composition has a non-tacky, particularly attractive, uniform surface, and is free of bubbles.

Component A and component B can contain additional constituents, in particular filler materials and reinforcing agents, pigments, plasticizers and/or diluents, curing agents and crosslinking agents, accelerators and catalysts, stabilizers, adhesion promoters, rheology agents, drying agents and the like. When additional constituents of this type are used, care must be taken to ensure that these are compatible with one another and with the respective component, and will not enter into any premature reactions, especially with the silane-functional polymer and/or with the epoxy resin.

The composition comprises, in particular, at least one catalyst for crosslinking the silane-functional polymer by means of moisture. Catalysts of this type are preferably selected from the group consisting of organotin (IV) compounds, titanates, zirconates, aluminates, titanium, zirconium or aluminum chelates, tertiary amines, amidines and guanidines, for example dibutyltin dilaurate, dioctyltin dilaurate, dibutyltin diacetyl acetonate and dioctyltin diacetyl acetonate, tetraisobutoxy titanate and diisobutoxytitanium-bis-(ethylacetoacetate), N,N-dimethylbenzylamine, N,N-dimethylcyclohexylamine and 1,4-diazabicyclo[2.2.2]octane, 1,8-diazabicyclo[5.4.0]undec-7-ene and 1,1,3,3-tetramethylguanidine; and mixtures of said catalysts. Whereas organotin compounds, titanates, zirconates, aluminates and the chelates are preferably used in component A, tertiary amines, amidines and guanidines are preferably used in component B.

In a preferred embodiment, component B of the composition does not contain a metal-containing catalyst. This offers the advantage that no complexing between a metal-containing catalyst and amine group-containing constituents of component B can occur while component B is in storage, which would be undesirable.

Further preferably, the composition as a whole is free of tin(II) compounds, or free of bivalent tin compounds.

The composition further comprises, in particular, at least one aminosilane or epoxysilane or mercaptosilane, wherein an epoxysilane is preferably present as a constituent of component A and an aminosilane or mercaptosilane is preferably present as a constituent of component B. Particularly suitable in this case are 3-aminopropyl-dialkoxyalkylsilanes, 3-aminopropyl-trialkoxysilanes, N-(2-aminoethyl)-3-aminopropyl-dialkoxyalkylsilanes, N-(2-aminoethyl)-3-aminopropyl-trialkoxysilanes, 3-glycidoxypropyltrialkoxysilanes and 3-mercaptopropyl-trialkoxysilanes.

Preferred are 3-aminopropyl-trimethoxysilane, 3-aminopropyl-dimethoxymethylsilane, 3-aminopropyl-triethyoxysilane, N-(2-aminoethyl)-3-aminopropyl-dimethoxymethylsilane, N-(2-aminoethyl)-3-aminopropyl-trimethoxysilane, N-(2-aminoethyl)-3-aminopropyl-triethyoxysilane, 3-glycidoxypropyltrimoxysilane and 3-glycidoxypropyltriethoxysilane.

The use of such a silane can result in accelerated curing and, once the components have been mixed, improved compatibility of the different phases, and covalent bonding of the silane-functional polymer with the epoxy resin.

The composition very preferably contains at least one epoxy silane, which is present, in particular, as a constituent of component A. This embodiment offers the advantage that the epoxy silane does not come into contact with water before the two components are mixed, and as a result, its reactivity is not altered during storage.

The composition further comprises, in particular, at least one filler material, in particular as a constituent of component A. The filler material influences both the rheologic properties of the uncured composition and the mechanical properties and surface condition of the cured composition. Suitable filler materials are inorganic and organic filler materials, in particular natural, ground or precipitated calcium carbonates, which are optionally coated with fatty acids, in particular stearic acid, barite (heavy spar), talcs, quartz powders, quartz sand, dolomite, wollastonite, kaolins, calcined kaolins, mica (potassium aluminum silicate), molecular sieves, aluminum oxides, aluminum hydroxides, magnesium hydroxide, silicas including highly disperse silicas from pyrolytic processes, industrially produced carbon blacks, graphite, powdered metals such as aluminum, copper, iron, silver or steel, PVC powder, hollow spheres or glass spheres.

Preferred filler materials are calcium carbonates, calcined kaolins, carbon black, highly disperse silicas and flame-retardant filler materials, such as hydroxides or hydrates, in particular aluminum hydroxide.

It is entirely possible, and may even be advantageous, to use a mixture of different filler materials.

A suitable quantity of filler material in the composition preferably ranges from 10 to 70 wt %, in particular 20 to 60 wt %.

The composition can further contain additional constituents, in particular the following:

plasticizers, in particular carboxylic acid esters such as phthalates, in particular dioctyl phthalate, diisononyl phthalate or diisodecyl phthalate, hydrogenated phthalates, adipates, in particular dioctyl adipate, azelates, sebacates, polyols, in particular polyoxyalkylene polyols or polyester polyols, glycol ethers, glycol esters, organic phosphoric acid and sulfonic acid esters or polybutenes;

solvents;

fibers, in particular glass fibers, carbon fibers, metal fibers, ceramic fibers or plastic fibers, such as polyamide fibers or polyethylene fibers;

dyes;

pigments, in particular titanium dioxide or iron oxides;

adhesion promoters and/or crosslinking agents, in particular silanes such as the above-mentioned aminosilanes, epoxy silanes and mercaptosilanes, and aminosilanes having secondary amino groups, (meth)acrylatosilanes, anhydridosilanes, carbamatosilanes, alkylsilanes and iminosilanes, and oligomeric forms of these silanes, and also adducts of primary aminosilanes having epoxysilanes or (meth)acrylatosilanes or anhydridosilanes;

drying agents, in particular tetraethoxysilane, vinyl trimethoxysilane or vinyl triethoxysilane and organoalkyoxysilanes, which have a functional group in the α position to the silane group, in particular N-(methyl-dimethoxysilylmethyl)-O-methyl-carbamate, (methacryloxymethyl)silanes, methoxymethylsilanes, orthoformic acid ester, and calcium oxide or molecular sieves;

rheology modifiers, in particular thickening agents, especially sheet silicates, derivatives of castor oil, hydrogenated castor oil, polyamides, polyurethanes, urea compounds, pyrogenic silicas, cellulose ethers and hydrophobically modified polyoxyethylenes;

stabilizers against oxidation, heat, light and UV radiation;

natural resins, fats or oils, such as colophony, shellac, linseed oil, castor oil and soybean oil;

non-reactive polymers, in particular homopolymers or copolymers of unsaturated monomers, for example, particularly from the group comprising ethylene, propylene, butylene, isobutylene, isoprene, vinyl acetate and alkyl(meth)acrylates, in particular polyethylenes (PE), polypropylenes (PP), polyisobutylenes, ethylene vinyl acetate copolymers (EVA) and atactic poly-α-olefins (APAO);

flame-retardant substances, in particular the above-mentioned filler materials aluminum hydroxide and magnesium hydroxide, and particularly organophosphate esters, especially triethyl phosphate, tricresyl phosphate, triphenyl phosphate, diphenylcresyl phosphate, isodecyldiphenyl phosphate, tris(1,3-dichloro-2-propyl)phosphate, tris(2-chloroethyl)phosphate, tris(2-ethylhexyl)phosphate, tris(chloroisopropyl)phosphate, tris(chloropropyl)-phosphate, isopropylated triphenyl phosphate, mono-, bis- and tris(isopropylphenyl)phosphates having various degrees of isopropylation, resorcinol-bis(diphenyl phosphate), bisphenol-A-bis(diphenyl phosphate) and ammonium polyphosphates, for example;

surface-active substances, particularly wetting agents, leveling agents, degassing agents or defoaming agents;

biocides, in particular algicides, fungicides or substances that inhibit fungal growth;

and other substances routinely used in silane crosslinking and/or epoxy resin-based compositions.

Component A of the two-component composition is produced and stored with the exclusion of moisture. Component A is stable in storage, meaning that it can be stored free of moisture in suitable packaging or a suitable arrangement for a period of multiple months up to a year or more, without changes to its application properties or its properties after curing to a degree that is relevant to its use. Component B is likewise stable when stored in a closed container.

For application of the two-component composition, components A and B are mixed with one another, for example by stirring, kneading rolling or the like, but especially using a static mixer or with the aid of a dynamic mixer.

In the above step, the amine-epoxy adduct and other amine hydrogens that may be present in component B come into contact with the epoxy resin of component A, resulting in crosslinking of the epoxy resin in the composition. The water that is present in component B comes into contact with the silane-functional polymer, which leads to crosslinking of the silane-functional polymer in the composition.

For application of the two-component composition, the two components are preferably used in such a ratio that the weight ratio of component A to component B is within a range of 1:1 to 50:1, preferably 1:1 to 25:1, particularly preferably 1:1 to 10:1.

The mixing of components A and B and the curing are preferably carried out under ambient conditions, particularly at a temperature ranging from 10 to 30° C. However, curing at higher temperatures is also entirely possible, and leads to more rapid achievement of maximum curing. In certain cases, it can be advantageous to post-cure or fully cure the partially cured composition with the help of elevated temperature, for example within the range of 40 to 100° C.

In particular, the composition is cured in such a way that a sufficient pot life or open time is ensured to allow the composition to be applied correctly, while at the same time, curing proceeds quickly enough that the composition can be further processed and/or a bonding that is carried out using the composition is self-supporting and can be transported.

The present invention further comprises the use of the two-component composition as an adhesive, sealant or coating.

The two-component composition according to the invention is particularly suitable for the adhesion, sealing or coating of substrates made of glass, glass ceramic, concrete, mortar, brick, tile, gypsum and natural stones such as granite or marble;

metals and alloys, such as aluminum, iron, steel, and non-ferrous metals, including surface-finished metals and alloys, such as galvanized and chromium-plated metals;

leather, textiles, paper, wood, wood materials bonded with resins, such as phenol, melamine or epoxy resins, resin-textile composite materials and other so-called polymer composites;

plastics, in particular hard and soft PVC, ABS, polycarbonate (PC), polyamide (PA), polyester, PMMA, epoxy resins, PUR, POM, PO, PE, PP, EPM and EPDM, the plastics optionally being surface treated with plasma, corona or flames;

fiber-reinforced plastics (composites), such as carbon fiber-reinforced plastics (CRP), glass fiber-reinforced plastics (GRP) and sheet molding compounds (SMC);

coated substrates, such as powder-coated metals or alloys;

paints and varnishes, particularly automobile finish paints.

The substrates can be pretreated as necessary prior to application of the composition, particularly by physical and/or chemical cleaning processes or by applying an adhesion promoter, an adhesion promoting solution or a primer.

The two-component composition is preferably used for elastic to semi-structural adhesive and sealing applications in the construction and manufacturing industries and in vehicle manufacturing, for example for joint sealing, roof sealing, parquetry adhesion, façade element adhesion, fitting adhesion, seam sealing, cavity sealing, assembly, body panel adhesion, disk adhesion, and composite adhesion.

The two-component composition is particularly advantageous for cases in which isocyanate-free products are desirable for reasons of work and health safety.

The invention further relates to a cured composition obtained from the above-described two-component composition by mixing component A with component B.

The invention further relates to an article which has an at least partially cured composition according to the preceding description, said article being particularly a building structure, an industrial product or a means of transport, or a part thereof. A list of examples of articles of this type includes houses, glass facades, windows, bathtubs, bathrooms, kitchens, roofs, bridges, tunnels, roadways, automobiles, trucks, rail vehicles, buses, ships, wind turbine generators, mirrors, windshields, troughs, white goods, household appliances, dishwashers, washing machines, ovens, headlights, fog lights and solar panels, along with photovoltaic or solar thermal modules.

The described composition is characterized particularly by special mechanical properties, which can be varied within a wide range, from soft elastic with high extensibility and good strength to viscoelastic with low extensibility and very high strength. The variation of the mechanical properties can particularly be influenced by the ratio of silane-functional polymer to epoxy resin in component A and by the type and quantity of component B.

Using a component B which is an aqueous curing agent for epoxy resins as described results in particularly good miscibility of the two components, and a surface of the cured composition which is homogeneous, adhesion free and dry, without a matte coating or the like.

By using the described amine-epoxy adduct based on an aromatic monoepoxide, excellent properties are likewise achieved, in particular very high strengths; and the surface of the cured composition is likewise homogeneous and absolutely non-tacky and dry, without a matte coating or the like.

Examples

The following is a description of embodiments, which are meant to illustrate the described invention in greater detail. Of course, the invention is not limited to these described embodiments.

"ANEW" stands for amine hydrogen equivalent weight.
"EEW" stands for epoxy equivalent weight.
Description of the Test Methods
Viscosity was measured using a thermostated Rheotec RC30 cone/plate viscosimeter (cone diameter 50 mm, cone angle 1°, cone tip-plate distance 0.05 mm, shear rate 10-100 $s^{-1}$).

The odor was qualitatively assessed by smelling the mixed composition, with an unpleasant, pungent amine odor being assessed as "strong", a slight odor as "slight" and a barely perceptible or imperceptible odor as "none".

To measure gel time, a small portion of the mixed room-temperature composition was applied in a film thickness of approximately 3 mm to cardboard, and in a standard climate ("NC"; 23±1° C., 50±5% relative humidity), the time required until light pressure applied to the surface of the composition with a pipette made of LDPE left no residue on the pipette for the first time was determined.

The tensile strength, the elongation at break and the modulus of elasticity (E-modulus) up to an expansion of 0.5 to 5% were determined according to DIN EN 53504 (drawing rate 200 mm/min) using dumbbells measuring 75 mm in length, with a link length of 30 mm and a link width of 4 mm, which are produced by stamping from films of the composition, measuring approximately 3 mm in thickness, cured under the conditions specified in each case.

The appearance was assessed as follows: "sw" for snow-white, "w" for white, "y" for yellow, "a" for adhesive and "so" for slightly adhesive.

Silane-Functional Polymers:
Polymer 1:
With exclusion of moisture, 1000 g polyol Acclaim® 12200 (Bayer; low monol polyoxypropylenediol, OH number 11.0 mg KOH/g, water content approximately 0.02 wt %), 43.6 g isophorone diisocyanate (Vestanate® IPDI from Degussa), 126.4 g diisodecyl phthalate and 0.12 g dibutyltin dilaurate was heated under constant stirring to 90° C., and was held at this temperature until the titrimetrically determined concentration of free isocyanate groups had reached a level of 0.63 wt %. 62.3 g N-(3-trimethoxysilyl-propyl)-amino-succinic acid diethylester was then mixed in, and the mixture was stirred at 90° C. until no additional free isocyanate could be detected by means of FT-IR spectroscopy. The silane-functional polymer was cooled to room temperature and stored free of moisture.

Polymer 2:
SPUR+® 1015LM from Momentive.
Polymer 3:
MS Polymer™ S203H from Kaneka.
Amine-Epoxy Adducts and/or Aqueous Curing Agents
Curing Agent 1:
76.60 g Jeffamine® ED-2003 (Huntsman, polyoxyalkylenediamine based on propoxylated polyethylene glycol, molecular weight approximately 2000 g/mol) and 7.66 g Armeen® CD (Akzo Nobel; cocoalkylamine ($C_{12}$ fatty amine) having a molecular weight of approximately 200 g/mol) at a temperature of 90° C. was introduced into a round-bottomed flask under a nitrogen atmosphere. With strong stirring, 14.36 g Araldite® GY 250 (Huntsman; bisphenol A diglycidyl ether, EEW approximately 187 g/Eq) was added slowly, taking care to ensure that the temperature did not increase beyond 105° C., and this was then stirred for 2 hours at 90° C. 3.83 g 2,4-pentanedione was then added and was stirred in for 15 minutes at 90° C. Then 19.99 g N4-amine (BASF; N,N'-bis(3-aminopropyl)ethylenediamine), followed by another 11.49 g 2,4-pentanedione was added and was stirred in for a period of 15 minutes at 90° C. An additional 22.98 g Armeen® CD followed by another 43.09 g Araldite® GY 250 was then added, taking care to ensure that the temperature did not increase beyond 105° C., and the resulting mixture was then stirred for another 2 hours at 90° C. The reaction mixture was then combined with 126.5 g Jeffamine® D-230 (Huntsman; polypropylene glycol diamine having a molecular weight of approximately 240 g/mol), and another 98.5 g Araldite® GY 250 was added slowly with strong stirring, taking care to ensure that the temperature did not increase beyond 105° C.; the resulting mixture was stirred for a period of 90 min. at 90° C. 75 g isophorone diamine (Evonik; 1-amino-3-aminomethyl-3,5,5-trimethylcyclohexane) was then added, and finally, the reaction mixture was combined with 194.5 g water, cooled, and the curing agent was stored in a sealed vessel. The result was a yellowish liquid having a viscosity at 20° C. of 42 Pa*s, a theoretical ANEW of 160 g/eq and a water concentration of 20 wt %.

Curing Agent 2:
INCOREZ 148/300 (Incorez Ltd.), a curing agent with a polyamine-epoxy adduct base having an AHEW of 140 g/eq and a water concentration of 20 wt %, containing tetraethylenepentamine.

Curing Agent 3:
A reaction product of 116.0 parts by weight 1,5-diamino-2-methylpentane and 182 parts by weight Araldite® DY-K (cresol monoglycidyl ether having an EEW of approximately 182 g/Eq, from Huntsman). A yellowish liquid having a viscosity at 20° C. of 5.8 Pa*s and a theoretical AHEW of 99.4 g/eq.

Production of Component A and Component B
For each component A and each component B, the constituents indicated in table 1 and table 2 were mixed in the quantities indicated (in parts by weight) by means of a dynamic mixer, and were stored free of moisture.

TABLE 1

Composition of components A-1 to A-8.

| | Component: | | | | | | | |
|---|---|---|---|---|---|---|---|---|
| | A-1 | A-2 | A-3 | A-4 | A-5 | A-6 | A-7 | A-8 |
| Polymer 1 | 49.5 | 49.2 | 49.35 | 66.1 | — | — | 78.8 | 32.8 |
| Polymer 2 | — | — | — | — | 66.3 | — | — | — |
| Polymer 3 | — | — | — | — | — | 66.1 | — | — |
| Araldit ® GY-250 | 49.5 | 49.2 | 49.35 | 32.6 | 32.7 | 32.6 | 19.7 | 66.5 |
| DBTDL[1] | 1.0 | 1.0 | 1.0 | 1.3 | 1.0 | — | 1.5 | 0.7 |
| DBTacac[2] | — | — | — | — | — | 1.3 | — | — |
| Epoxysilane[3] | — | 0.6 | 0.3 | — | — | — | — | — |

[1] Dibutyltin dilaurate 10 wt % in diisodecyl phthalate
[2] Dibutyltin diacetylacetonate 10 wt % in diisodecyl phthalate
[3] 3-glycidoxypropyl trimethoxysilane

TABLE 2

Composition of components B-1 to B-7.

| | Component: | | | | | | |
|---|---|---|---|---|---|---|---|
| | B-1 | B-2 | B-3 | B-4 | B-5 | B-6 | B-7 |
| Curing agent 1 | 98.0 | 99.0 | 100.0 | 97.5 | — | — | — |
| Curing agent 2 | — | — | — | — | 98.0 | — | — |
| Curing agent 3 | — | — | — | — | — | 93.1 | 88.2 |
| Aminosilane[1] | 2.0 | 1.0 | — | 2.0 | 2.0 | 1.9 | 1.8 |
| DBU[2] | — | — | — | 0.5 | — | — | — |
| Water | — | — | — | — | — | 5.0 | 10.0 |

[1] N-(2-aminoethyl)-3-aminopropyltrimethoxysilane
[2] 1,8-diazabicyclo[5.4.0]undec-7-ene Production of Mixed Compositions For each composition, components A and B indicated in tables 3 to 5 were mixed in the quantities indicated (in parts by weight) by means of a dynamic mixer to form a homogeneous liquid, which was tested immediately as described above:

The results are indicated in tables 3 to 5.

The cured compositions all exhibit excellent resiliency.

TABLE 3

Composition and properties of Z-1 to Z-8.

| | Composition | | | | | | | |
|---|---|---|---|---|---|---|---|---|
| | Z-1 | Z-2 | Z-3 | Z-4 | Z-5 | Z-6 | Z-7 | Z-8 |
| Component A-1 | 100 | 100 | 100 | — | — | — | — | 100 |
| Component A-2 | — | — | — | 100 | 100 | — | — | — |
| Component A-3 | — | — | — | — | — | 100 | 100 | — |
| Component B-1 | 10 | 25 | 40 | — | — | — | — | — |
| Component B-2 | — | — | — | — | — | 25 | 35 | — |
| Component B-3 | — | — | — | 25 | 35 | — | — | 20 |
| Odor | None | None | None | None | None | None | None | None |
| Gel time (min.) | 145 | 110 | n.d. | 70 | 50 | 50 | 37 | 240 |
| Mechanical Properties (14 days NC): | | | | | | | | |
| Tensile strength (MPa) | 1.2 | 2.0 | 2.6 | 2.0 | 2.6 | 1.7 | 1.9 | 1.6 |
| Elongation at break (%) | 175 | 210 | 135 | 250 | 160 | 210 | 120 | 440 |
| E-modulus | 1.0 | 2.9 | 4.3 | 2.9 | 4.8 | 2.7 | 4.2 | 0.7 |
| Appearance | sw | sw | sw | w | w | w | w | w |
| Mechanical Properties (14 days NC + 2 days at 80° C.): | | | | | | | | |
| Tensile strength (MPa) | 4.1 | 3.9 | 3.8 | 4.0 | 3.9 | 2.8 | 2.9 | 3.4 |
| Elongation at break (%) | 240 | 90 | 80 | 108 | 97 | 72 | 58 | 200 |
| E-modulus | 3.0 | 5.9 | 8.2 | 5.9 | 8.0 | 5.3 | 7.1 | 2.2 |

"n.d." stands for "not determined"

TABLE 4

Composition and properties of Z-9 to Z-16.

| | Composition | | | | | | | |
|---|---|---|---|---|---|---|---|---|
| | Z-9 | Z-10 | Z-11 | Z-12 | Z-13 | Z-14 | Z-15 | Z-16 |
| Component A-1 | 100 | 100 | 100 | 100 | 100 | — | — | — |
| Component A-4 | — | — | — | — | — | 100 | 100 | 100 |
| Component B-1 | — | — | — | — | — | 10 | 30 | — |
| Component B-4 | — | — | — | — | — | — | — | 30 |
| Component B-5 | 20 | 35 | — | — | — | — | — | — |
| Component B-6 | — | — | 16 | 25 | — | — | — | — |
| Component B-7 | — | — | — | — | 16 | — | — | — |
| Odor | Slight | Slight | None | None | None | None | None | None |
| Gel time (min.) | 240 | 95 | 130 | 80 | 90 | 75 | 50 | 15 |
| Mechanical Properties (14 days NC): | | | | | | | | |
| Tensile strength (MPa) | 1.7 | 1.7 | 6.2 | 5.6 | 5.2 | 1.4 | 2.7 | 2.4 |
| Elongation at break (%) | 200 | 75 | 210 | 140 | 240 | 230 | 165 | 165 |

TABLE 4-continued

Composition and properties of Z-9 to Z-16.

| | Composition | | | | | | | |
|---|---|---|---|---|---|---|---|---|
| | Z-9 | Z-10 | Z-11 | Z-12 | Z-13 | Z-14 | Z-15 | Z-16 |
| E-modulus | 3.7 | 12.6 | 2.5 | 3.8 | 2.1 | 0.5 | 1.9 | 1.9 |
| Appearance | w | W | sw | sw | sw | w | w | w |
| Mechanical Properties (14 days NC + 2 days at 80° C.): | | | | | | | | |
| Tensile strength (MPa) | 2.7 | 2.4 | 5.8 | 4.0 | 5.1 | 2.4 | 3.1 | 2.1 |
| Elongation at break (%) | 110 | 45 | 125 | 45 | 125 | 170 | 140 | 125 |
| E-modulus | 9.1 | 22.6 | 5.1 | 8.0 | 4.6 | 1.7 | 3.1 | 2.5 |

TABLE 5

Composition and properties of Z-17 to Z-23.

| | Composition | | | | | | |
|---|---|---|---|---|---|---|---|
| | Z-17 | Z-18 | Z-19 | Z-20 | Z-21 | Z-22 | Z-23 |
| Component A-5 | — | 100 | 100 | — | — | — | — |
| Component A-6 | — | — | — | 100 | 100 | — | — |
| Component A-7 | 100 | — | — | — | — | — | — |
| Component A-8 | — | — | — | — | — | 100 | 100 |
| Component B-1 | 20 | 20 | — | 20 | — | 20 | 40 |
| Component B-4 | — | — | 20 | — | 20 | — | — |
| Odor | None | None | None | None | None | None | None |
| Gel time (min.) | 45 | 70 | 60 | 240 | 170 | 230 | 200 |
| Mechanical Properties (14 days NC): | | | | | | | |
| Tensile strength (MPa) | 2.0 | 1.2 | 1.3 | 1.2 | 1.1 | 1.6 | 0.6 |
| Elongation at break (%) | 230 | 590 | 550 | 660 | 600 | 69 | 1 |
| E-modulus | 1.2 | 0.4 | 0.4 | 0.4 | 0.3 | 9.3 | n.d. |
| Appearance | w | w, a | y | w, a | w, sa | w | w |
| Mechanical Properties (14 days NC + 2 days at 80° C.): | | | | | | | |
| Tensile strength (MPa) | 2.0 | 1.5 | 1.6 | 1.5 | 1.3 | 4.7 | 4.1 |
| Elongation at break (%) | 195 | 510 | 430 | 430 | 440 | 21 | 9 |
| E-modulus | 1.1 | 0.6 | 0.5 | 0.6 | 0.4 | 40.4 | 66.5 |

The invention claimed is:

1. A two-component composition consisting of
a component A, which comprises
   at least one silane-functional polymer and
   at least one epoxy resin; and
a component B, which comprises
   water and
   at least one amine-epoxy adduct which has at least three amine hydrogens;
wherein
   the amine-epoxy adduct is a reaction product of at least one polyamine and at least one monoepoxide; and
   the at least one monoepoxide is a glycidyl ether of a phenol.

2. The two-component composition according to claim 1, wherein the ratio by weight of the silane-functional polymer to the epoxy resin is within a range of 10:1 to 1:3.

3. The two-component composition according to claim 1, wherein the polyamine is selected from the group consisting of 1,5-diamino-2-methylpentane, 2,2,4- and 2,4,4-trimethylhexamethylenediamine, isophoronediamine, 1,3- and 1,4-bis(aminomethyl)cyclohexane, 1,3-bis(aminomethyl)benzene, diethylenetriamine, triethylenetetramine, tetraethylenepentamine, pentaethylenehexamine, N-(2-aminoethyl)-1,3-propanediamine, N,N'-bis(3-aminopropyl) ethylenediamine and polyoxypropylene and polyoxyethylene diamines having an average molecular weight ranging from 200 to 3000 g/mol.

4. The two-component composition according to claim 1, wherein component B contains 5 to 30 wt % water.

5. The two-component composition according to claim 1, wherein component B additionally comprises a polyamine having at least two primary amino groups, which is not identical to the polyamines used for producing the amine-epoxy adduct.

6. The two-component composition according to claim 5, wherein component B additionally comprises at least one amine hydrogen-containing emulsifier.

7. The two-component composition according to claim 6, wherein the amine hydrogen-containing emulsifier
   is a reaction product of at least one diepoxide, at least one fatty amine and at least one polyoxyethylenediamine in a molar ratio of approximately 1:1:1,
   and/or
   a reaction product of at least one diepoxide, at least one fatty amine and at least one polyalkylene amine in a molar ratio of approximately 1:1:1.

8. The two-component composition according to claim 1, further comprising at least one catalyst for crosslinking the silane-functional polymer by means of moisture.

9. The two-component composition according to claim 1, further comprising at least one aminosilane or epoxysilane or mercaptosilane.

10. The two-component composition according to claim 1, further comprising at least one filler material.

11. The two-component composition according to claim 1, wherein the ratio by weight of component A to component B ranges from 1:1 to 50:1.

12. An adhesive, a sealant or a coating comprising the two-component composition according to claim 1.

13. A cured composition obtained from a two-component composition according to claim 1 by mixing component A with component B.

14. The two-component composition according to claim 1, wherein the amine-epoxy is obtained by reacting the at least one polyamine with the at least one monoepoxide in a molar ratio ranging from 1/0.8 to 1/1.5.

15. The two-component composition according to claim 1, wherein the ratio by weight of component A to component B ranges from 1:1 to 10:1.

16. A two-component composition consisting of
a component A, which comprises
   at least one silane-functional polymer and
   at least one epoxy resin; and
a component B, which comprises
   water and
   at least one amine-epoxy adduct which has at least three amine hydrogens;
wherein the amine-epoxy adduct is the reaction product of
   1,5-diamino-2-methylpentane or a mixture of 2,2,4- and 2,4,4-trimethylhexamethylenediamine with cresyl-glycidyl ether in a molar ratio of 1/0.8 to 1/1.5.

17. A two-component composition consisting of
a component A, which comprises
   at least one silane-functional polymer and
   at least one epoxy resin; and
a component B, which comprises
   water and
   at least one amine-epoxy adduct which has at least three amine hydrogens;
wherein the amine-epoxy adduct is the reaction product of 1,5-diamino-2-methylpentane or a mixture of 2,2,4- and 2,4,4-trimethylhexamethylenediamine with cresyl-glycidyl ether in a molar ratio of from 1/0.9 to 1/1.2.

* * * * *